(12) United States Patent
Barri et al.

(10) Patent No.: US 7,474,672 B2
(45) Date of Patent: Jan. 6, 2009

(54) FRAME ALTERATION LOGIC FOR NETWORK PROCESSORS

(75) Inventors: Peter I. A. Barri, Bonheiden (BE); Claude Basso, Raleigh, NC (US); Jean L. Calvignac, Cary, NC (US); Brahmanand K. Gorti, Cary, NC (US); Joseph F. Logan, Raleigh, NC (US); Natarajan Vaidhyanathan, Greensboro, NC (US); Johan G. A. Verkinderen, Ghent (BE)

(73) Assignee: International Business Machines Corporation, Armonk, NY (US)

(*) Notice: Subject to any disclaimer, the term of this patent is extended or adjusted under 35 U.S.C. 154(b) by 1054 days.

(21) Appl. No.: 10/364,069

(22) Filed: Feb. 11, 2003

(65) Prior Publication Data

US 2004/0156368 A1  Aug. 12, 2004

(51) Int. Cl.
*H04J 3/22* (2006.01)
(52) U.S. Cl. .................. 370/466; 370/360; 370/392
(58) Field of Classification Search ............. 370/466, 370/392, 401, 474, 395.5, 419, 467, 469
See application file for complete search history.

(56) References Cited

U.S. PATENT DOCUMENTS

| | | | | |
|---|---|---|---|---|
| 4,763,321 | A | | 8/1988 | Calvinac et al. ............. 370/94 |
| 4,771,391 | A | | 9/1988 | Blasbalg ................. 364/514 |
| 5,222,085 | A | * | 6/1993 | Newman ................. 370/422 |
| 5,282,202 | A | | 1/1994 | Bernstein et al. .......... 370/94.1 |
| 5,560,038 | A | * | 9/1996 | Haddock ................. 709/236 |
| 5,594,728 | A | | 1/1997 | Hershey et al. ............. 370/471 |
| 5,699,350 | A | | 12/1997 | Kraslavsky ............... 370/254 |
| 5,923,653 | A | | 7/1999 | Denton .................... 370/375 |
| 6,128,735 | A | * | 10/2000 | Goldstein et al. .......... 713/166 |
| 6,185,214 | B1 | * | 2/2001 | Schwartz et al. ........... 370/401 |
| 6,259,699 | B1 | * | 7/2001 | Opalka et al. ............. 370/398 |
| 6,490,280 | B1 | * | 12/2002 | Leung .................... 370/392 |
| 6,694,380 | B1 | * | 2/2004 | Wolrich et al. ............. 710/5 |
| 7,085,266 | B2 | * | 8/2006 | Calvignac et al. .......... 370/360 |
| 7,133,931 | B1 | * | 11/2006 | Allison et al. ............. 709/246 |
| 7,149,212 | B2 | * | 12/2006 | Calvignac et al. .......... 370/360 |

(Continued)

OTHER PUBLICATIONS

Anonymous: "IBM Network Processor (IBM32NPR161EPXCAC133 Product Overview" [Online], X002354316, pp. 1-18 (Nov. 4, 1999).

(Continued)

*Primary Examiner*—Hassan Kizou
*Assistant Examiner*—Mounir Moutaouakil
(74) *Attorney, Agent, or Firm*—Sawyer Law Group LLP

(57) ABSTRACT

Packet switching node in a communication system includes apparatus for receiving incoming information packets or frames which contain header portions with formatting control blocks. Information in the frame's header contains frame alteration commands for modifying the information in the frame. The modifications include adding new information, deleting information, and overlaying information. Decoders and control devices in an alteration engine interpret the commands and apply the modifications to the frame data. Common and standard data patterns are stored for insertion or overlaying to conserve data packet space.

8 Claims, 7 Drawing Sheets

U.S. PATENT DOCUMENTS

| | | | |
|---|---|---|---|
| 7,218,647 B2 * | 5/2007 | Ozguner | 370/471 |
| 7,224,701 B2 * | 5/2007 | Ozguner | 370/471 |
| 7,239,635 B2 * | 7/2007 | Ozguner | 370/392 |
| 2001/0033575 A1 * | 10/2001 | Shimamura et al. | 370/419 |
| 2001/0037464 A1 * | 11/2001 | Persels et al. | 713/201 |
| 2002/0061022 A1 | 5/2002 | Allen, Jr. et al. | |
| 2002/0107908 A1 * | 8/2002 | Dharanikota | 709/203 |
| 2002/0163935 A1 * | 11/2002 | Paatela et al. | 370/466 |
| 2004/0156368 A1 * | 8/2004 | Barri et al. | 370/395.63 |

OTHER PUBLICATIONS

Anonymous: "IBm Netowrk Processor (IBM32NPR161EPXCAC133 Databook" [Online], XP002354317, p. 1-108 (Nov. 15, 1999).

European Search Report for European Patent Application Serial No. EP04290268 dated Nov. 28, 2005.

* cited by examiner

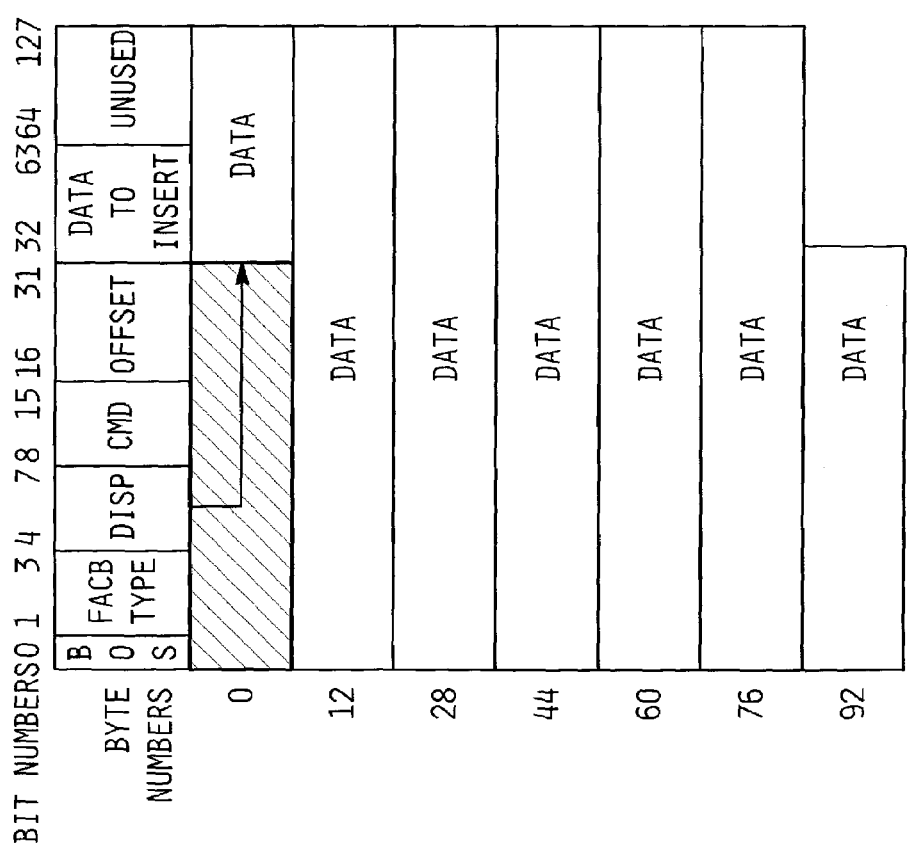
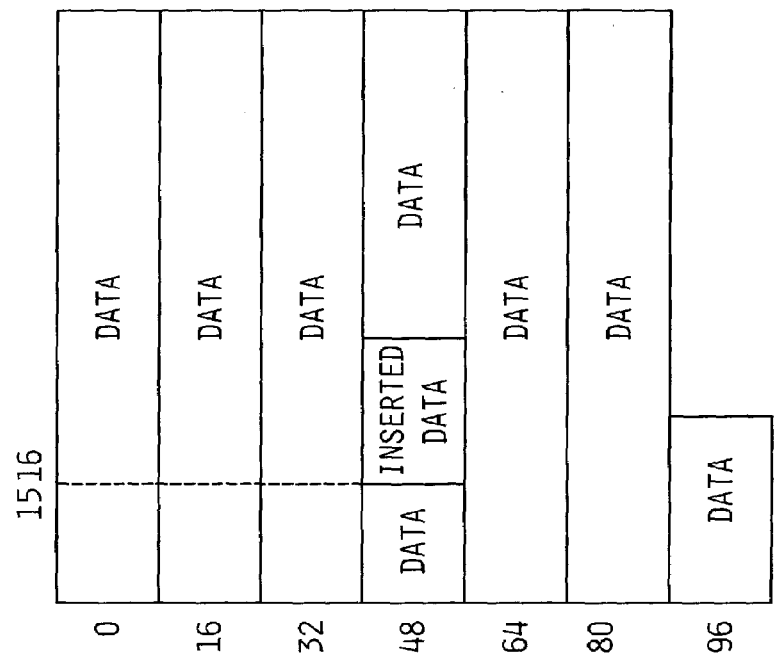
FIG. 6B
FIG. 6A

FRAME ALTERATION LOGIC FOR NETWORK PROCESSORS

CROSS-REFERENCE TO RELATED APPLICATIONS

This patent application is related to U.S. patent application by Calvignac et al., Ser. No. 09/792,557 for STORING FRAME MODIFICATION INFORMATION IN MEMORY, filed Feb. 23, 2001.

BACKGROUND OF THE INVENTION

1. Field of the Invention

1. This invention relates to network communication systems. More particularly, it relates to modification of frames (message packets) in nodes forming a path from sender to receiver.

2. Description of the Related Art

Packet switching networks operate by relaying data along a series of nodes from a sending node to a final receiving node. These nodes or points are often computers programmed to process the frames, forwarding them to other nodes if necessary according to routing information in the frame.

Communications among computers and networks operate at ever-increasing speeds. There are also a number of differing protocols, often requiring changes to formats along the communication paths. Protocols dictate the format of header information which includes source and destination addresses and data which can include digitized voice data. The information transmitted in packets or frames is usually of predetermined sizes although there is flexibility in the dimensions of message frames. Frame alterations or modifications sometimes need to be changed, added to, or deleted from frame headers. The changes can be implemented in hardware but hardwired modification circuits are not as versatile as software implementations which can be more easily changed albeit slower in operation. A hybrid system uses a combination of hardware, universal in nature, and software for control.

There are several known systems for processing frames in a network structure. The simplest might be merely to transmit the information to the next terminal. More adaptable systems may use frame alteration at each node for more efficient transmission through the network

BRIEF SUMMARY OF THE INVENTION

In accordance with the invention, a packet switching node in a communication system includes apparatus for receiving incoming information packets or frames. A processor controls frame alteration commands for modifying the information in the frame. The modifications include adding new information, deleting information, and overlaying information. Decoders and control devices in an alteration engine interpret the commands and apply the modifications to the frame data. Common or often used data patterns can be stored in alteration arrays for insertion into a data frame, precluding the necessity of using packet data space.

BRIEF DESCRIPTION OF THE DRAWING

The invention is described in detail by referring to the various figures which illustrate specific embodiments of the invention, and wherein like numerals refer to like elements.

FIG. 1 is an illustration of an frame alteration control block format.

FIG. 2 is an example of a use of the format.

FIG. 3 is a flowchart showing a manner of operation for one embodiment of the invention.

FIG. 4 is a block diagram of an apparatus for practicing the invention.

FIG. 5 is a block diagram of a frame alteration unit.

FIG. 6 is an illustration of an unaltered frame and the resulting altered frame.

FIG. 7 is a logic diagram of an alteration engine according to the invention.

FIG. 8 is a logic diagram for supplying a new byte to an output frame.

DETAILED DESCRIPTION OF THE INVENTION

The following explanation discloses a preferred mode of practicing the invention but other implementations are possible given the teachings of the invention.

U.S. patent application Ser. No. 09/792,557 for STORING FRAME MODIFICATION INFORMATION IN MEMORY, described in more detail in the Cross Reference section of this application, is incorporated herein by reference. This invention is relates particularly to the frame alteration LOGIC 212 as shown in FIG. 2 thereof.

As frames arrive from the network, they are stored in a memory. An area is reserved in memory immediately preceding the frame's data for storage of one or more frame alteration control blocks. During frame processing, software executed by a processor writes the frame alteration commands into the frame alteration control blocks. The frame is then queued for transmission onto the network by placing it in a port queue. Hardware apparatus then services the port queue by reading the frame alteration control blocks, applying the requested alterations to the frame data and transmitting the modified frame onto the network.

FIG. 1 shows a 128-bit (quadword) frame alteration control block. In FIG. 1, a one-bit bottom-of-stack field 11 specifies the frame is the bottom of stack if set to 1. The first frame alteration control blocks in a list of multiple frame alteration control blocks will have the first bit set to 0. The bottom-of-stack bit is then set to 1 in the frame alteration control block immediately preceding the first quadword of the packet data.

A three-bit field 12 indicates the type of frame access control block. More than one type can be defined, each containing frame alteration commands that are specific to a particular scenario. Some frame access control block types may be optimized for Ethernet frame alteration and others, for Packet-over-Sonet frame alteration. The system uses the frame alteration control block type field 12 to determine how to parse information in the Frame Alteration Commands field 17.

A four-bit displacement field 15 is used only in the bottom-of-stack frame alteration control block to define the offset to the first valid packet data byte in the first quadword of the packet data. This field is required as the starting byte position to skip over unused bytes in the first quadword of the packet data.

Bits 8 through 127 of the quadwords in the frame alteration control block stack contain the frame alteration commands 17. These are the commands to be applied to a packet as it is transmitted. The frame alteration commands are specific to the frame alteration control block type.

FIG. 2 shows an example of an frame alteration control block stack with two quadwords of a data packet. The bottom-of-stack field 201 of the first frame alteration control block is set to 0 as are those of the following two quadwords. The bottom-of-stack field 202 of the fourth quadword is set to 1 since it is at the bottom of the stack. The displacement field 203 of the fourth quadword points to the beginning of the packet data in the following quadword or buffer.

Figure 1:
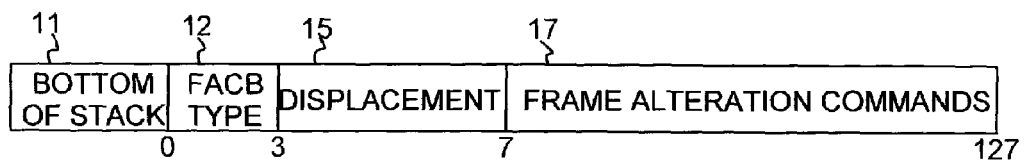
Figure 2:
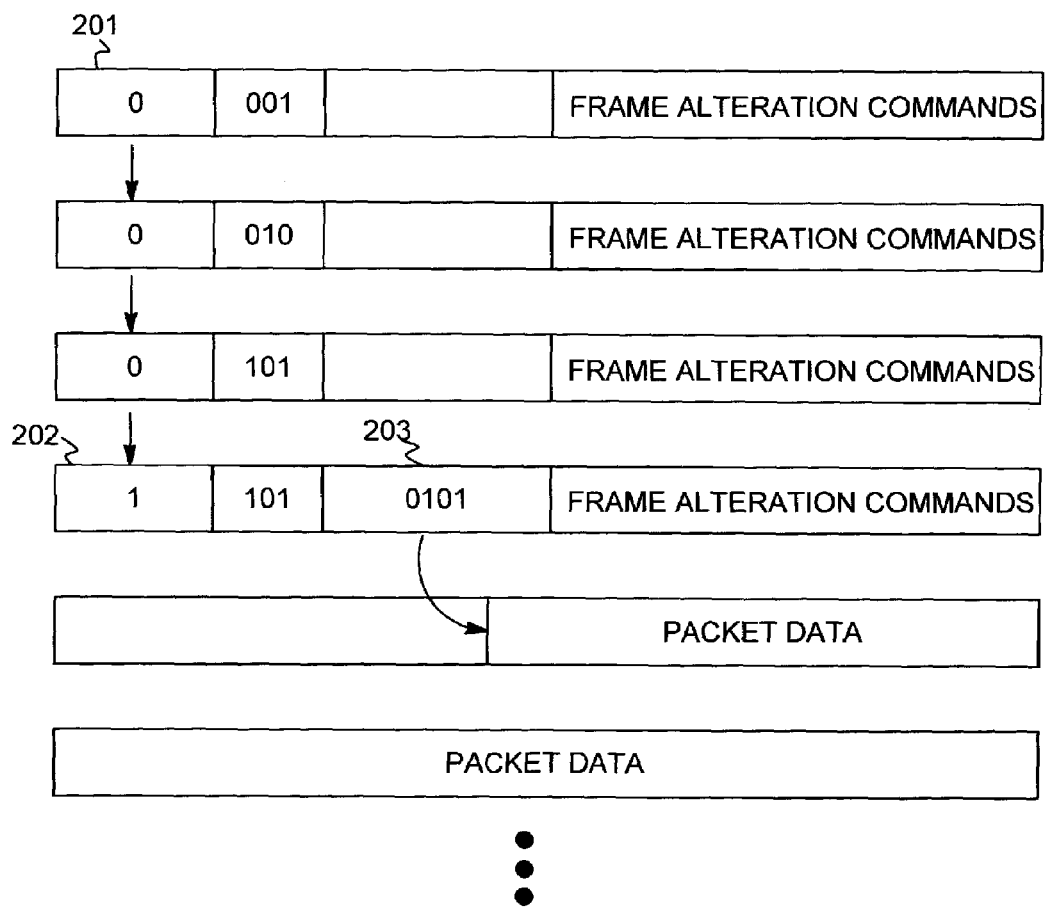
Figure 3:
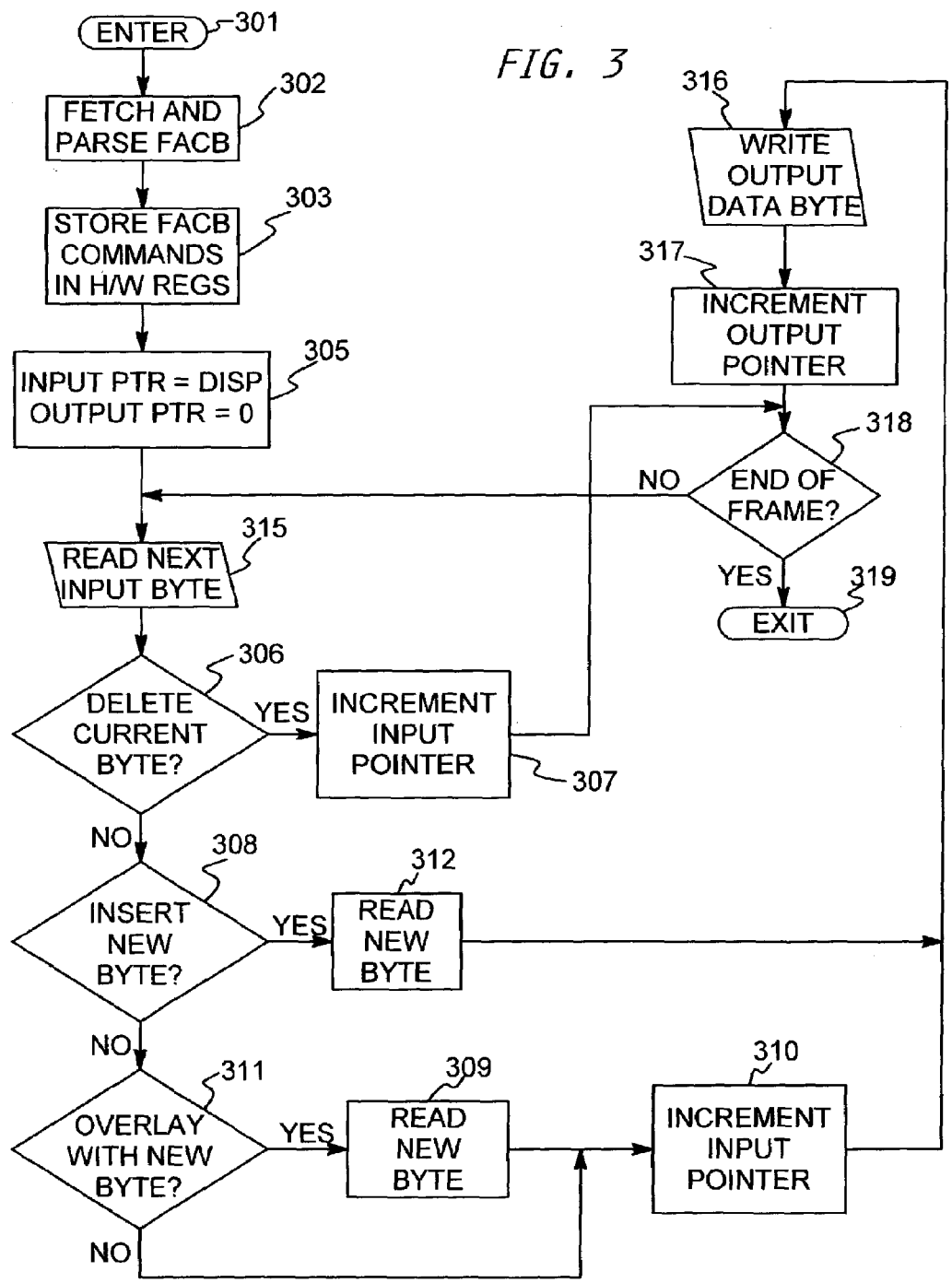

The flowchart of FIG. 3 illustrates an example of a frame alteration procedure where the changes are to insert, to overlay, or to delete data within the frame. A terminal block 301 starts the procedure. A process block 302 fetches the frame alteration control block from a memory device storing the frame to be altered and parses it into the frame alteration control block portion and the data portion. The frame alteration control block commands are stored in hardware registers by a process block 303. In a process block 305, the input data pointer is set to the value of the DISP field of the frame to skip the unused bytes in order to locate the beginning of the data in the input frame and the pointer to the output data bytes is set to zero. The first input byte is read from the input frame by an input/output block 315.

A decision block 306 determines whether the current input byte is to be deleted. This is accomplished by testing the contents of the input data pointer against the OFFSET field in the frame alteration control block for equality. If the frame alteration control block command specifies that the current data byte is to be deleted, the input data byte pointer is incremented by a process block 307. No further is action is performed and the present data byte is not written to the output as part of the altered frame. The process then continues at a decision block 318 which determines whether the last input data byte has been read from the frame alteration control block storage memory, i.e., whether the end of the input frame has been reached. If so, the process is exited at a terminal block 319.

If the end of the frame has not been reached, the process continues at the input/output block 315 to read the next input data byte.

If the frame alteration control block command is not a delete instruction, the process continues from the decision block 306 to a decision block 308 to determine whether the frame alteration control block command is an insert instruction. If so, the replacement byte is read from the appropriate frame alteration control block field or the alteration array 511 (FIG. 5) and written as the output byte by a process block 316 Next, the output data pointer is incremented by a process block 317. The end-of-frame test is then performed at the decision block 318 as previously described.

If the frame alteration control block command is not an insert instruction, the process continues from the decision block 308 to a decision block 311 to determine whether it is an overlay instruction. If so, then the new (overlaying) byte is read from the frame alteration control block data field and the input data pointer is incremented in a process block 310. The overlaying byte is then written as the output byte.

If the frame alteration control block command is neither a delete, an insert, nor an overlay instruction, then the byte read from the input frame is written as the output byte after incrementing the input data pointer at the process block 310.

Adding other frame alteration control block commands is within the skill of the art given the present explanation. For example, bytes can be incremented, decremented, inverted, and otherwise modified as desired.

Figure 4:
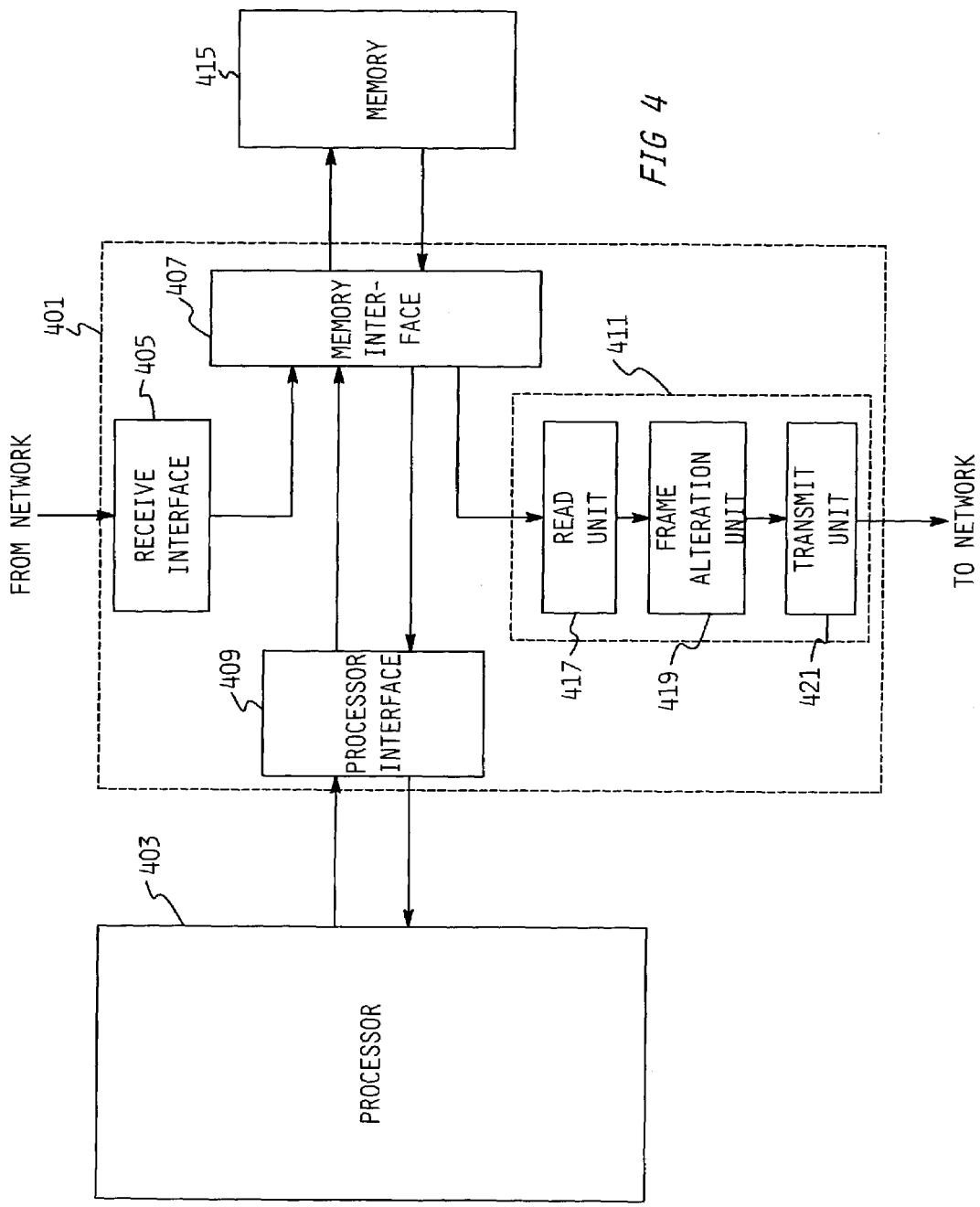

In FIG. 4, a data flow controller 401 is coupled to a processor 403 for generating the frame alteration commands based on the protocol of the network. In the data flow controller 401, a receive interface 405 transfers a frame from the network to a memory interface 407 for storage in a memory.

The memory interface 407 extracts the frame header from the memory 415 and transfers it to the processor 403 via a control interface 409. The processor 403 generates the frame alteration commands contained in the header and returns frame alteration control blocks to the memory 415 via the control interface 409 and memory interface 407. The frame alteration control blocks are stored in the memory 415 immediately preceding the beginning of the frame data.

Next, the data flow controller 401 reads the frame alteration control block and data from the memory 415 under the control of a transmit controller 411 and transfers them to a read unit 417. The frame alteration control block and data are transferred to a frame alteration unit 419 which applies the alterations according to the contents of the frame alteration control blocks. The output frame data is then moved to a transmit unit 421 which transmits them to the network.

Figure 5:
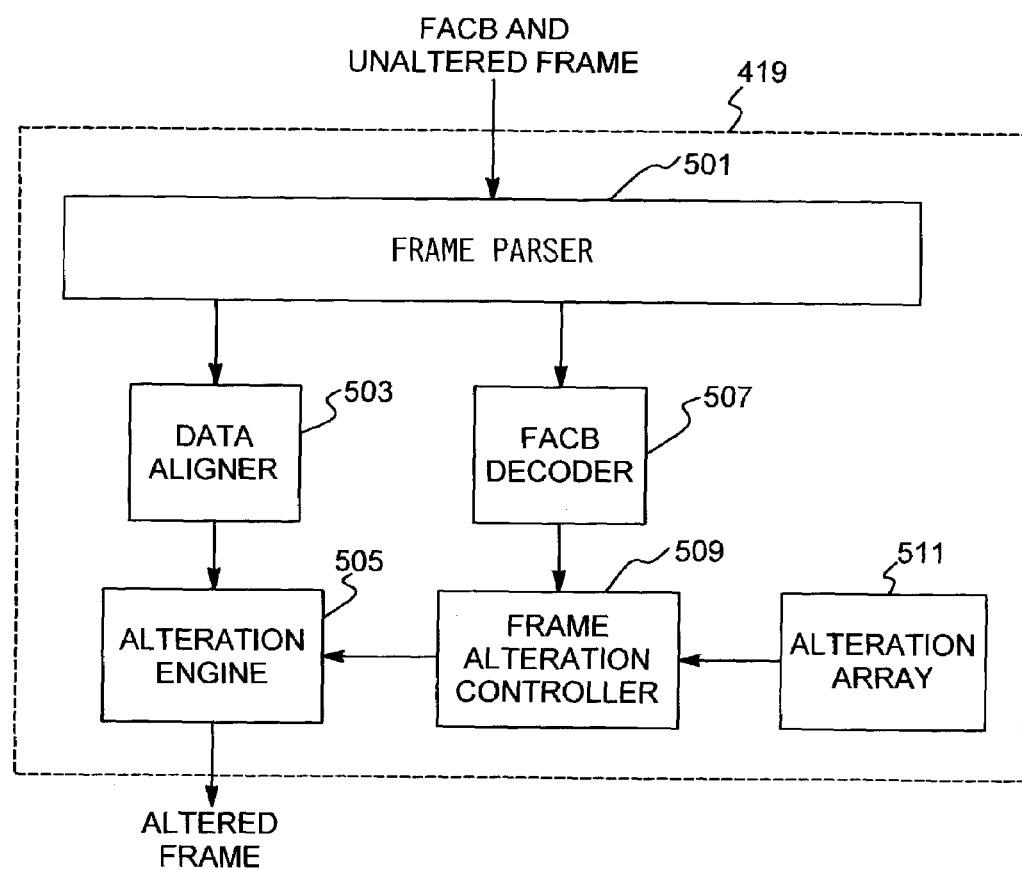

Details of the frame alteration unit 419 are shown in FIG. 5. A frame parser 501 separates the frame alteration control blocks and frame data. Unaltered and unaligned frame data are sent a data aligner 503 which realigns the data to even 16-byte boundaries since the unaltered frame data may not be so aligned. This was accomplished by setting data pointers as shown in the process block 305 of FIG. 3. The aligned data is then applied to an alteration engine 505.

The frame alteration control blocks are applied from the frame parser 501 to an frame alteration control block decoder 507. The frame alteration control block decoder 507 interprets the frame alteration control block bits and moves the frame alteration commands to a frame alteration controller 509. The frame alteration controller 509 disassembles the frame alteration commands from the frame alteration control block decoder 507 into basic instructions which are coupled to the alteration engine.

An alteration array 511 is an optional storage device that supplies frequently used data patterns to be inserted or overlay data in the input frame under alteration. When a frame alteration command is decoded that designates one of the patterns is to be inserted or to overlay frame data, the designated configuration is extracted from the alteration array 511 by the frame alteration controller 509 and moved to the alteration engine 505.

The described operations accomplish the frame alterations in the alteration engine 505 by using the instruction to insert, to delete, to overlay, to increment, plus others as needed to assemble altered data frames which are then applied to the transmit unit 421 of FIG. 4. The process for executing the instructions were described above with reference to FIG. 3.

FIG. 6 shows an example of a frame alteration. FIG. 6A illustrates an exemplary input frame with its accompanying frame alteration control block and FIG. 6B illustrates a resulting altered output frame. This example inserts four bytes of data from the frame alteration control block (top row of FIG. 6A) at a 50-byte data offset specified by bits 16 to 31 of the frame alteration control block.

The BOS (bottom-of-stack bit 0) is set to 1 to indicate that this is the only frame alteration control block in the stack. The frame alteration control block TYPE (bits 1-3) identifies the format of bits 8-127. The DISP field (displacement bits 4-7) specifies where the data begins. The CMD (command field bits 8-15) is a unique code which in this example indicates that there is 4-byte data field to be inserted at a point in the data field specified-by the OFFSET (bits 16-31). The data to be inserted is the field comprising bits 32-63.

FIG. 6B shows the altered frame as transmitted. The data is aligned on even numbered 16-byte data fields and the inserted data is shown at the 50th byte, i.e., byte 48 plus 16 bits (two bytes).

Figure 7:
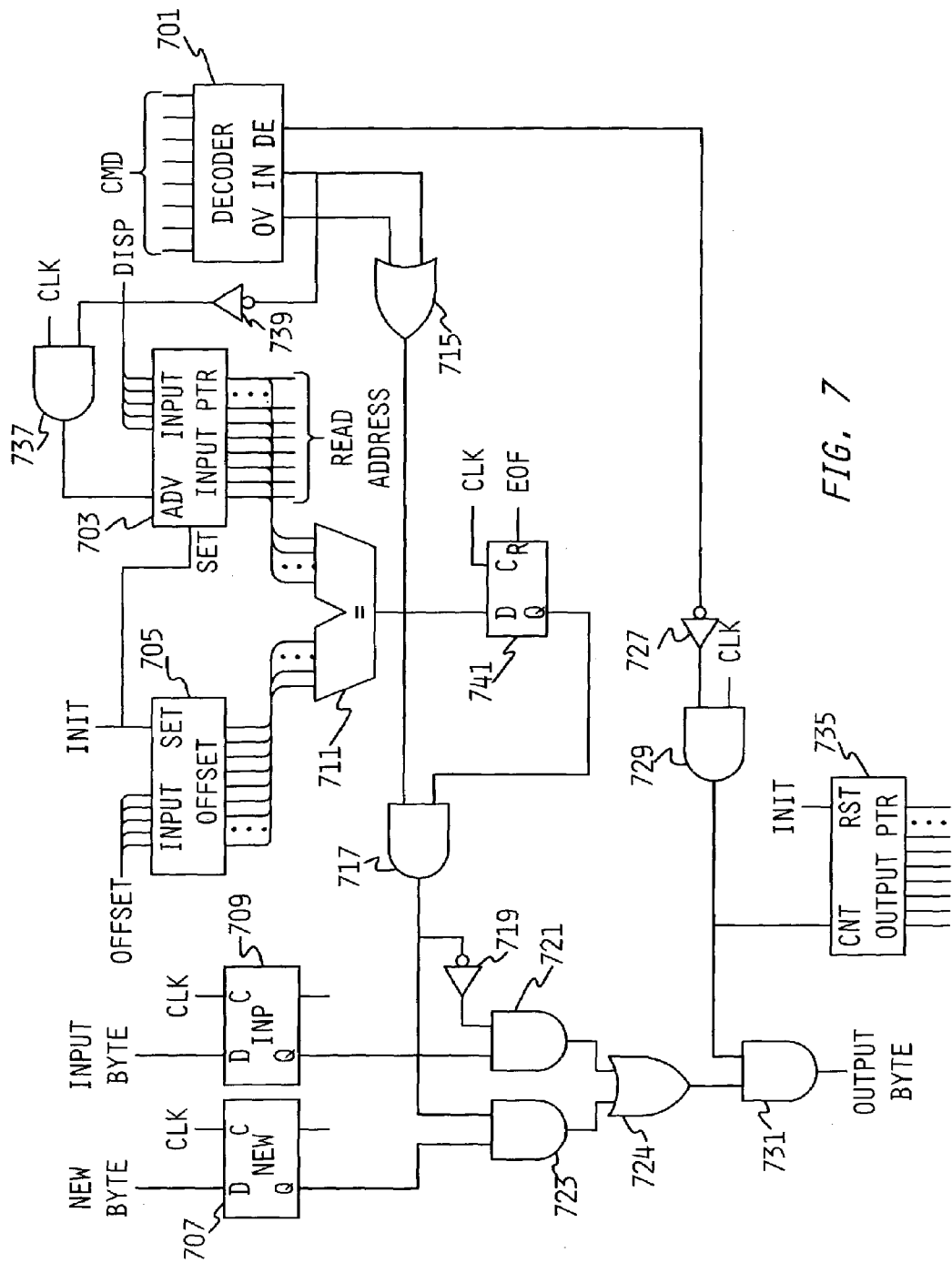

A hardware implementation of the alteration engine 505 in FIG. 5 is shown in FIG. 7. Bytes from the unaltered input frame are stored in a register 709. Bytes from the frame alteration control block field to be inserted or overlaid are stored in a register 707. Each successive byte is stored by a timing signal CLK.

The command in the frame alteration control block CMD field is gated to a decoder 701 to be executed. In the example under consideration, the instructions are overlay (OV), insert (IN), and delete (DE). The OV and IN output signals from the decoder 701 are applied to input terminals of an OR gate 715. The output signal from the OR gate 715 is applied to an input terminal of an AND gate 717.

The other input signal to the AND gate 717 is from a flip-flop 741 which is set by a comparator 711 when the READ ADDRESS is equal to the OFFSET field of the frame alteration control block. The flip-flop 741 is reset by an EOF signal indicating that the end of the data to be inserted or overlaid has been reached. This permits the INPUT PTR counter 703 to continue to advance and to address the next input data bytes from the input frame's data field. The DISP field contents of the frame alteration control block are set into a counter INPUT PTR 703 by an initialization signal INIT and is incremented by successive CLK timing signals when the command being executed is not an INSERT instruction by means of an AND gate 737 and an INVERTER 739. When the instruction is an INSERT, the inverter 739 inhibits the AND gate 737. The INPUT PTR counter 703 keeps track of the next byte to be read from the unaltered input frame's data field so its output signals also supply the read address of the bytes.

The other input to the comparator 711 is an offset register 705 which is loaded by the INIT signal and stores the contents of the OFFSET field of the frame alteration control block. The comparator 711 supplies an output signal when the read address from the INPUT PTR 703 equals the OFFSET value, causing the flip-flop 741 to be set at the next CLK signal. The output signal from the flip-flop 741 enables the AND gate 717 when bytes are to be overlaid or inserted during execution of an overlay or insert instruction from the decoder 701 as indicated by the output signal from the OR gate 715.

When the AND gate 717 is enabled, the new byte is passed by an AND gate 723 to an OR gate 724. When the AND gate 717 is disabled, either because the OFFSET address has not been reached or the command being executed is neither an overlay or insert instruction, an inverter 719 enables an AND gate 721 to pass the current input byte from the register 709 to the OR gate 724.

The byte from the OR gate 724 is coupled to an AND gate 731 to be gated as the output byte at the next CLK signal if the command is not a delete instruction (DE from the decoder 701). The CLK signal is applied to an AND gate 729 except when inhibited by the output from an INVERTER 727 when the command being executed is a DELETE instruction. When the output signal from the AND gate 729 gates the output byte at the AND gate 731, it also increments an OUTPUT PTR counter 735.

Figure 8:
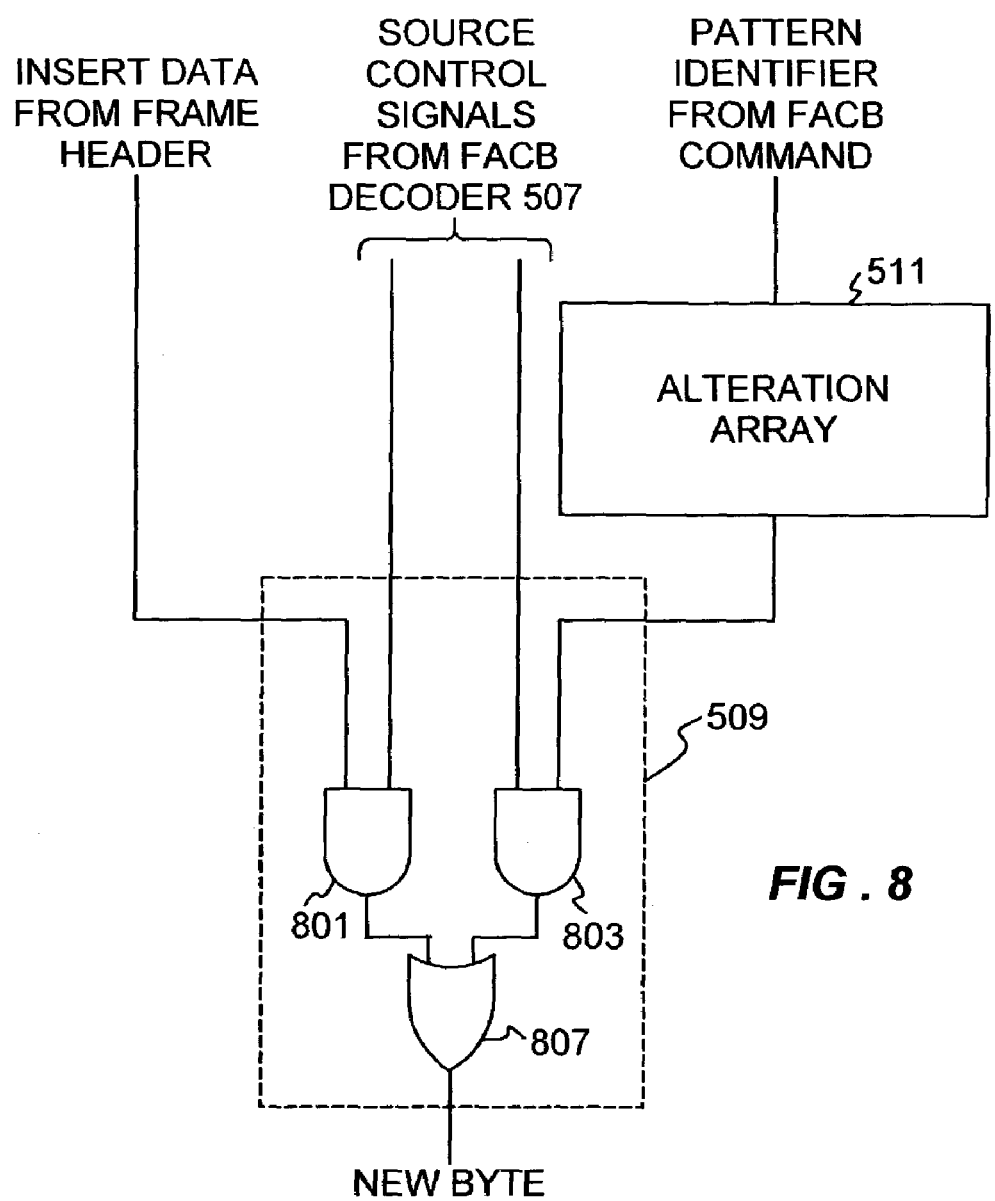

Some data patterns are common and often repeated. For example, converting from one protocol to another usually necessitates that fixed patterns be inserted or overlaid on part of the frame data. FIG. 8 is a block diagram showing details within the frame alteration controller 509 in FIG. 5 for providing the new byte to the NEW register 707 of FIG. 7.

Data to be inserted from the FACB header is coupled to one input of an AND gate 801. A pattern identifier, which can be an address supplied by a frame alteration command, reads a desired data pattern from the alteration array 511 to an input of an AND gate 803. Source control signals from a frame alteration command and decoded by the FACB decoder 507 enables one of the AND gates 801 or 803 if a new byte is to be supplied to the alteration engine. The output from an enabled AND gate is applied to an OR gate 807 to supply the new byte.

The contents of the alteration array 511 can be dynamic. That is, its contents can be altered under software control to enable the logic to handle a wide variety of protocols and standard data patterns.

The operation of the read unit of FIG. 5 as well as the interfaces are well known in the art and need not be explained in detail for an understanding of the invention or how to make and to use it.

While the invention has been particularly shown and described with reference to a preferred embodiment thereof, it will be understood by those skilled in the art that various changes and modifications in form and details may be made therein without departing from the spirit and scope of the invention according to the following claims.

What is claimed is:

1. A method for relaying information in frames among nodes of a packet switching network, the method comprising:
   acquiring incoming information frames, said incoming information frames including header portions designating format information, frame alteration commands specifying and instructing changes to information in the frames, and packets containing information data, wherein the frame alteration commands are included in one or more frame alteration control blocks in the frame, the frame alteration control blocks including a type field specifying the type of frame, wherein the frame alteration commands are specific to the specified type of frame, and wherein a plurality of types of frame are specifiable in the type field, at least one of the plurality of types of frame being associated with a first network protocol and at least one different one of the types of frame being associated with a second network protocol different from the first network protocol;
   parsing the frame alteration control blocks to obtain said frame alteration commands, the parsing being based on the type of frame as obtained from the type field of the frame alteration control blocks, and changing the information included in said frames as instructed by said frame alteration commands to convert the incoming information frames from one network protocol to a different network protocol, including
      decoding said alteration commands to control the changing of the information in said frames;
      storing predetermined data patterns;
      selecting a desired predetermined data pattern as instructed by said frame alteration commands; and
      providing a selected predetermined data pattern and inserting or overlaying the selected predetermined data pattern in the information in said frames to convert the frames to the different network protocol; and
   relaying altered frames to a different node of the packet switching network.

2. The node of claim 1 further including
   an offset mechanism that determines locations of data to be transformed;
   a pointer mechanism that indicates locations of data passing through said node;
   a comparator mechanism that indicates locations from the offset mechanism and the pointer mechanism are equal; and
   a mechanism responsive to equality signals from said comparator mechanism and controlling insertion and passage of data to the output mechanism.

3. The node of claim 1 further including
a deletion mechanism responsive to the decoder mechanism and inhibiting passage of data to said output mechanism.

4. The node method of claim 1 wherein the frame alteration control blocks include a new byte that is to be overlaid over an existing byte in the frame.

5. A method of altering data in data frames containing frame alteration control blocks, the method comprising:
receiving a data frame at a node in a packet switching network and parsing frame alteration blocks in the data frame to separate alteration commands included within the frame alteration blocks and data included in the data frame, the alteration commands specifying and instructing changes to the data in the data frame, and wherein the frame alteration control blocks include a type field specifying the type of frame, wherein the alteration commands are specific to the specified type of frame, and wherein a plurality of types of frame are specifiable in the type field, at least one of the plurality of types of frame being associated with a first network protocol and at least one different one of the types of frame being associated with a second network protocol different from the first network protocol;
controlling alteration of the data in the data frame as instructed by the alteration commands to convert the data frame from one network protocol to a different network protocol, the alteration including parsing of the frame alteration control blocks to obtain said frame alteration commands and changing of information in the data frame, the parsing being based on the type of frame as obtained from the type field of the frame alteration control blocks,
the controlling alteration including decoding said alteration commands to control the changing of the information in said data frame, selecting a stored predetermined data pattern as instructed by said frame alteration commands, and inserting or overlaying the selected predetermined data pattern in the information in said data frame to convert the data frame to the different network protocol; and
outputting altered frames to a different node in the packet switching network.

6. The method of claim 5
wherein the stored predetermined data pattern is inserted as new data in the data frame.

7. The method of claim 5 including in the controlling step a step of deleting data from the data frame.

8. The method of claim 5
wherein the stored predetermined data pattern is overlaid over existing data in the data frame as new data.

* * * * *